United States Patent [19]

Dubbe

[11] Patent Number: 4,770,124

[45] Date of Patent: Sep. 13, 1988

[54] TIMED FEEDING SYSTEM FOR DAIRY CATTLE

[76] Inventor: Ronald F. Dubbe, 356 W. 3½ St., Waconia, Minn. 55387

[21] Appl. No.: 2,213

[22] Filed: Jan. 12, 1987

[51] Int. Cl.⁴ ............................................... A01K 5/00
[52] U.S. Cl. ................................ 119/51.11; 119/56 R
[58] Field of Search ............ 119/51.11, 52 AF, 56 R, 119/52 R, 51.15; 222/181

[56] References Cited

U.S. PATENT DOCUMENTS

| | | | |
|---|---|---|---|
| 455,504 | 7/1891 | Boland | 119/56. R |
| 3,105,463 | 10/1963 | Pilch | 119/52. AF |
| 3,742,913 | 7/1973 | Crippen | 119/51.11 |
| 4,200,060 | 4/1980 | Van Daele | 119/56 |
| 4,401,057 | 8/1983 | Van Gilst | 119/51.11 X |

*Primary Examiner*—Robert Peshock
*Attorney, Agent, or Firm*—Wood, Dalton, Phillips, Mason & Rowe

[57] ABSTRACT

A timed feeding system for dairy cattle includes a timer controlled air compressor, a pneumatic cylinder having a reciprocable piston, and a master cable fastened at one end to the piston, to reciprocate with the piston. A plurality of cable support brackets maintain the master cable in a horizontal orientation. A pulley is mounted rotatably in each cable support bracket, and a lift cable, attached to the master cable near the pulley, rides over the pulley and hangs vertically. Attached to the bottom end portion of each lift cable is a ball valve. The ball valve normally is seated in the discharge opening of a feed storage and dispensing container supported below its associated cable support bracket. The compressor is operable to move the piston, master cable and lift cables, to raise each ball valve and permit discharge of feed previously loaded into the container. A plurality of bolts are arranged in a grid pattern across the open top of each container. A rigid sleeve, surrounding each lift cable, is attached at its upper end to its associated cable mounting bracket and at the lower end to its associated grid, to protect the lift cable from any contact with the dairy cattle.

20 Claims, 2 Drawing Sheets

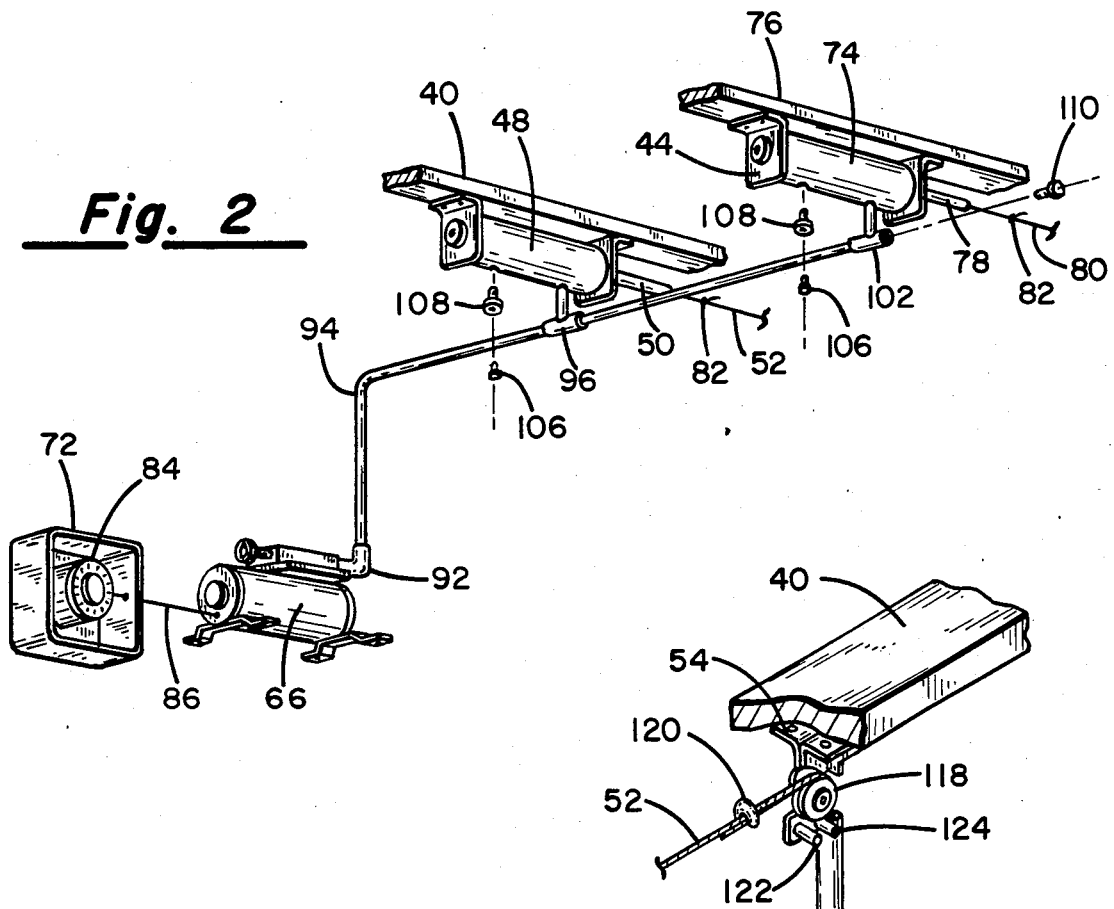
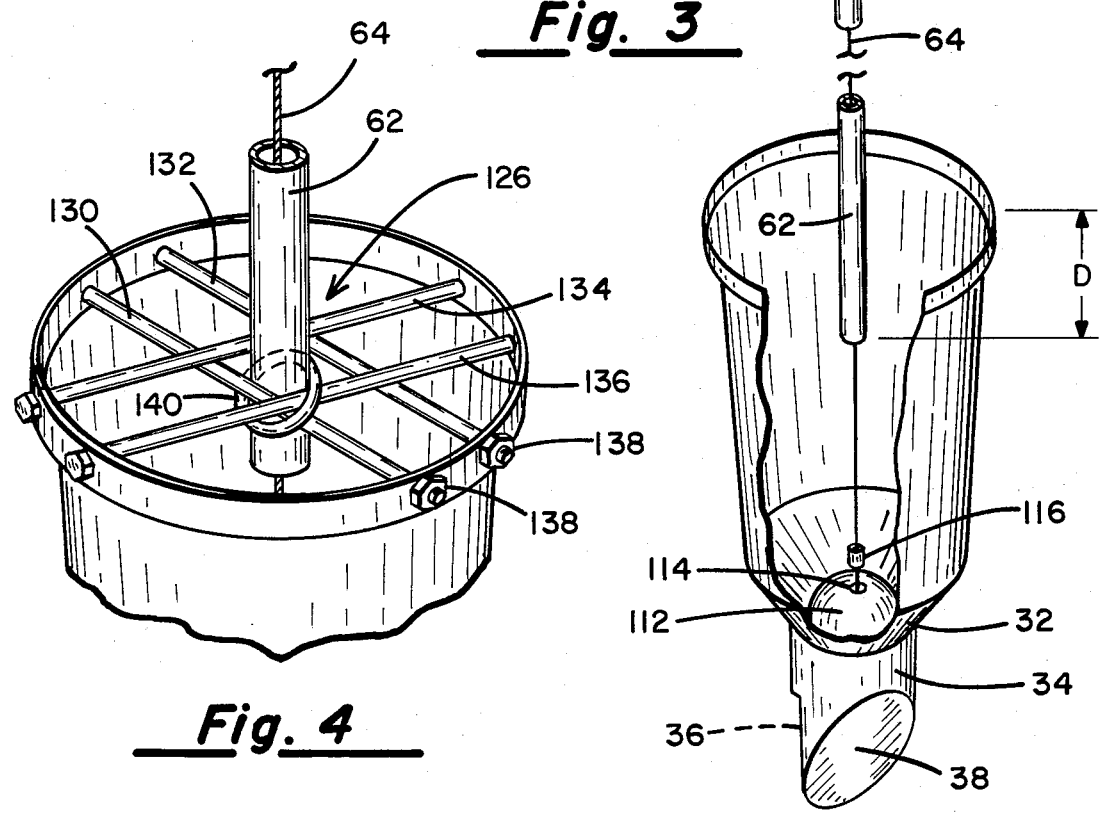

TIMED FEEDING SYSTEM FOR DAIRY CATTLE

BACKGROUND OF THE INVENTION

This invention relates to apparatus for feeding livestock, and more particularly to a timed-release system to facilitate a more frequent feeding of dairy cattle.

The raising and care of dairy cattle is a demanding occupation. Dairy cows must be milked twice daily, without fail. The dairy barn, milking station, milk storage tank and other equipment all are subject to strict governmental standards of cleanliness, and the produced milk is tested for butterfat content, bacterial count and the like, again subject to strict standards. To the greatest extent possible the dairy cows must be kept free of disease, and must be properly fed.

In connection with feeding, it has been found that milk production increases when dairy cattle are fed more frequently, with feed supplied in smaller amounts at each feeding. One study found that cows fed six times daily had an average production of 82.0 pounds of milk per day, as compared to 78.4 pounds per day when fed only twice daily. Too much grain, especially if supplied at one or two daily feedings, can overload the rumen and create acidosis to diminish the appetite. Thus, it has been recommended to feed grain at least three and preferably four times daily.

The price of more frequent feeding, however, is a substantial inconvenience. For example, four evenly spaced feedings per day might occur at 6:00 A.M., 12:00 noon, 6:00 P.M. and 12:00 midnight. To address this problem, automatic feeding systems have been devised, for example as that shown in U.S. Pat. No. 4,185,587 to Kallin granted Jan. 29, 1980. Kallin shows a hog feeder including an auger-driven conveyor for supplying feed to each of a plurality of individual feeders mounted over a trough. At the bottom of each feeder is a pear-shaped stopper. A series of branch lines, each attached to an associated stopper and to a main cable, allow the stoppers to be simultaneously pulled back from associated openings at the bottom of each feeder to dispense the feed.

While this system is perhaps satisfactory, it has become apparent that cattle learn to push against the main cable, releasing feed before the selected time and damaging the cable or feeder to which the cable is attached. Another shortcoming of the system is that it does not enable individualized feeding, for example supplying supplement in varying amounts to dairy cows receiving the same amount of grain.

Therefore, it is an object of the present invention to provide a feeding system which permits frequent feeding, in reduced amounts, without requiring the presence of the dairy operator at each feeding.

It is another object to provide a feed dispensing system that allows individual variation of the amount and mix of feed supplied to the cattle.

Another object is to provide a timed feeding system constructed to prevent premature release of feed by the cattle.

Yet another object is to provide a feed system that can handle feed of high moisture content and permits convenient, individualized loading of feed dispensing containers.

SUMMARY OF THE INVENTION

To achieve these and other objects, there is provided an apparatus for feeding livestock. The apparatus includes a generally vertically disposed feed container, open at its top to facilitate loading of feed into the container. The container also has a feed discharge opening, of a predetermined shape, at its bottom. The apparatus includes a valve member with a shape selected to enable its seating into the discharge opening to prevent passage of feed through the discharge opening. A generally vertically disposed linkage means is provided for moving the valve member vertically into and out of it seating to store feed and to dispense feed, respectively. A control means selectively raises and lowers the linkage means. A shield extends upwardly from the container and at least substantially surrounds the linkage means, to prevent livestock from contacting the linkage means. A fastening means joins a lower end portion of the shield with respect to the container.

Preferably the discharge opening is circular, and the valve member is formed as a sphere, with the linkage means comprising a steel lift cable attached to the valve and surrounded by the shield, which can be a metal sleeve extending downwardly a selected distance below the container top. The control means preferably includes a pneumatic cylinder with a reciprocable piston, and a master cable connected to the piston and to the lift cable, so that the lift cable and valve reciprocate as the piston reciprocates.

Thus, feed is loaded into the container with the valve seated at the bottom, and later is dispensed by raising the valve. An air compressor in fluid communication with the pneumatic cylinder provides a convenient means for raising the valve.

A further feature of the invention is a pluarlity of elongate bolts extending across the top of the container in a grid pattern. The grid arrangement permits loading of grain and feed supplement into the container through its open top, yet prevents straw and other bulky foreign matter from entering the container. The grid also provides a means for fastening the bottom portion of the tubular sleeve with respect to the container. A metal band can surround the sleeve and one of the bolts to secure them to one another.

A timer can be set to activate the compressor at the desired time to automatically release feed from the container. Because feed is directly loaded into the container through its top, feed having a moisture content too high for transport by augers is nonetheless usable in this system. The amount of grain, supplement or both can be individually tailored to each dairy cow.

In another aspect of this invention, a series of feed containers, valves and lift cables can be arranged in a row, with all lift cables attached at their upper ends to a single master cable controlled by a single pneumatic cylinder and compressor. The compressor, when activated, simultaneously raises a series of valves to dispense feed collectively. The compressor is deactivated following feed release, permitting the valves to descend and become seated once again. This descent can be controlled by a selectively sized orifice in a plug mounted in fluid communication with the pneumatic cylinder, to provide a sufficient descent speed to ensure positive seating, yet avoid undue impulse or shock that might damage the containers. Each of the lift cables is surrounded by its associated sleeve, preventing accidental or intentional premature release of feed, and preventing damage to the lift cable, valve or dispenser, due to action of the cattle.

IN THE DRAWINGS

For a better understanding of the above and other features and advantages, reference is made to the detailed description and accompanying drawings, in which:

FIG. 2 is a perspective exploded view of a portion of the system in FIG. 1 which controls dispensing of feed;

FIG. 3 is a perspective view of a feed container of the feeding system, with portions of the container removed to illustrate an associated ball valve and related assembly;

FIG. 4 is an enlarged perspective view of the top of the container; and

DETAILED DESCRIPTION OF THE PREFERRED EMBODIMENT

Figure 1:
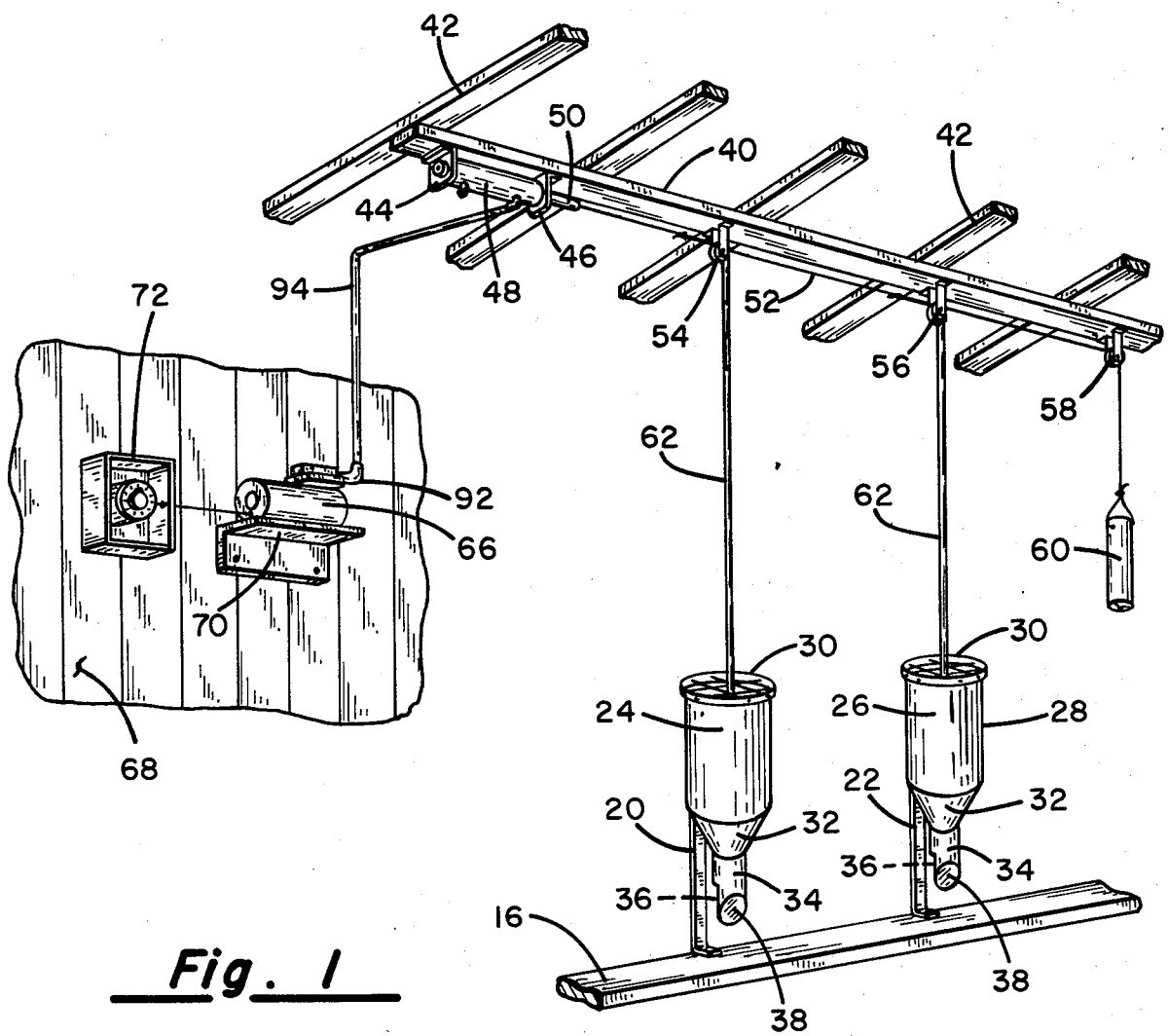
FIG. 1 is a perspective view of a timed dairy cattle feeding system constructed in accordance with the present invention.

Turning now to the drawings, there is shown in FIG. 1 a timed feeding system for dairy cattle, installed for example in a dairy barn. The system is illustrated in connection with a row of tie stalls, formed with a rigid horizontal member 16 secured to the floor of the dairy barn, and a plurality of tubular upright members 20 and 22 integral with the horizontal member. Typically, a strap (not shown) of leather or similar material is mounted between each pair of adjacent upright members, and secured loosely around the neck of a particular dairy cow, to keep the cow in its appropriate tie stall.

First and second feed storage and dispensing containers 24 and 26 are fixed to upright members 20 and 22, respectively. Saddle and U-bolt clamps (not shown) are suitable for this purpose. Each container has a generally cylindrical body 28, and a top 30 which is open to facilitate loading of feed into the container. A tapered portion 32 near the bottom of the container converges inwardly and downwardly to a throat 34 which surrounds a discharge or dispensing opening 36 through which feed in the containers is released to the barn floor. An inclined deflector plate 38, extended from one side of throat 36, diverts the feed to a selected location on the floor.

The entire container including body 28, tapered portion 32, throat 34 and deflector plate 38 is preferably a durable plastic such as polyethylene, and can be constructed as a unitary member. Deflector plates 38 are oriented to selectively direct feed as it is discharged so that, for example, feed discharged from container 24 is released to floor 18 between upright members 20 and 22, while feed from container 26 is released to the right of upright member 22 as viewed in the figure. While only two containers are shown, the present system can be designed with rows of up to thirty-five containers. Also, in dairy barns utilizing stanchions in lieu of tie stalls, the containers are readily attached to the vertical support posts between adjacent stanchions.

That part of the livestock feeding system which controls the dispensing of feed is supported from the barn ceiling, particularly from a brace 40 mounted to a plurality of ceiling beams 42 transversely of the beams. Cylinder support brackets 44 and 46 secure a pneumatic cylinder 48 with respect to brace 40. A reciprocal piston 50 is contained within cylinder 48 and extends horizontally outward from the right end of the cylinder.

Fastened to the outward end of piston 50 is a master cable 52, preferably constructed of galvanized steel. A plurality of cable support brackets 54, 56 and 58 support master cable 52 along beam 40. Beyond cable support bracket 58 a weight 60 is attached to the master cable to maintain it in tension and in its horizontal orientation.

Attached to each of cable support brackets 54 and 56 is a tubular lift cable sleeve 62, preferably of metal. Contained within each sleeve 62 is a galvanized steel lift cable 64 (FIG. 3), the upper end of which is fastened to master cable 52 just to the left of its associated one of the cable support brackets. Thus, as piston 50 reciprocates horizontally within pneumatic cylinder 48, master cable 52 also reciprocates horizontally (except for the end portion near weight 60), and each lift cable, over the majority of its length, reciprocates vertically An air compressor 66, supported next to a wall 68 of the dairy barn on a shelf 70, provides air under pressure to pneumatic cylinder 48 in order to reciprocate piston 50. More particularly, the pressurized air causes piston 50 to move inwardly of the cylinder or to the left as viewed in FIG. 1, pulling master cable 52 toward cylinder 48 and raising all of lift cables 64. When compressor 66 is de-activated, pressurized air escapes from the pneumatic cylinder, allowing piston 50 to move outwardly of the cylinder, largely in response to the tension caused by weight 60 on master cable 52. By means of an electrical timer switch 72 mounted to wall 68, compressor 66 is activated and de-activated at predetermined times corresponding to desired livestock feeding times.

FIG. 2 illustrates in more detail the timing control portion of the feeding system, and further shows a second pneumatic cylinder 74 attached to a second brace 76 and having a reciprocally mounted piston 78 to which is attached a second master cable 80 operating another row of feed containers, not shown. Cable clamps 82 secure the master cables to their associated pistons. Pursuant to the setting of a dial 84 on timer switch 72, the timer switch becomes closed to supply electric power to air compressor 66 through an electrical line 86, at a predetermined time and for a predetermined amount of time. Compressor 66 includes an inlet air filter 88 and an elbow 92 to which is connected a length of flexible tubing 94 providing the fluid path for pressurized air from the compressor to pneumatic cylinder 48, specifically to a T-connection 96 in fluid communication with cylinder 48 through a bushing. An additional tubing length 100 provides fluid communication between T-connection 96 and a second T-connection 102 mounted into second cylinder 74 through a bushing. Each cylinder has a breather vent 106 attached at the opposite end from that of the T-connection, through a bushing 108. Mounted into the remaining end of second T-connection 102 is an orifice plug 110.

The construction of feed storage and dispensing container 24 is best understood from FIGS. 3 and 4. Parts of body 28 and tapered portion 32 are removed to reveal a ball-shaped valve 112 seated in dispensing opening 36. The lower end portion of lift cable 64 is fastened to valve 112 through an eye 114 mounted to the valve, and by a galvanized wire rope clip 116. Ball valve 112 is hollow, preferably constructed of polyethylene, and filled with silica sand to give it weight. Lift cable sleeve 62 extends downwardly into container 24 a distance "D", preferably three inches, below the container top.

A portion of cable support bracket 54 is removed to reveal a rotatable pulley 118 over which lift cable 64 is mounted in a 90° bend. A cable clamp 120 secures the horizontal upper end portion of the lift cable to master cable 52. A spacer 122 separates opposite prongs of the support bracket, while a bolt 124 near the spacer is used to secure sleeve 62 to the support bracket.

When pneumatic cylinder 48 pulls master cable 52 in the direction indicated by the arrow, lift cable 64 travels with the master cable, thus to lift ball valve 112 out of its seating engagement within discharge opening 36 and to the position shown in broken lines at 112A. Any feed in container 24 readily is discharged upon such upward movement of the valve, with the compressor operating to retain ball valve 112 in its upper, open position a sufficient time to allow discharge of substantially all of the feed. Following discharge, the compressor is deactivated, allowing master cable 52 to move in the opposite direction (from the arrow) responsive to weight 60 and the weight of all ball valves connected to the master cable through their associated lift cables. Each ball valve 112 thus descends back into its seated engagement within its associated discharge opening, whereupon container 24 is ready for subsequent filling.

Loading is accomplished conveniently through the open tops of the containers. Yet, the open tops also present the risk that straw and other bulky matter will enter the containers, or that cattle will gain access to the feed through the top. To prevent these events, a grid 126 is formed across the top of container 24. More particularly, first and second bolts 130 and 132 span the top in one direction, while first and second crossbolts 134 and 136 span the top width in a direction normal to bolts 129–132. Each bolt is firmly secured by a lock nut, two of which are shown at 138.

Grid 126 further serves as a means for fastening the lower portion of lift cable sleeve 62 with respect to container 24, and similarly for fastening each associated lift collar sleeve and container. With sleeve 62 extended through one of the openings defined by grid 126, a band clamp 140 is wrapped around sleeve 62 and at least one of the bolts to secure the sleeve to the grid. Consequently, cattle cannot jostle and vibrate the sleeve, as it is firmly secured between its connection to the grid and its upper end connection to cable support bracket 54.

A feature of the present invention resides in the fact that sleeve 62, when so secured, positively prevents dairy cattle from intentional or inadvertent contact with lift cable 64. There is no chance for a premature release of feed from container 24 caused by a cow's "tripping" of the lift cable. The arrangement further prevents cattle from rapidly moving cable 64, to jerk the lift valve and drive it against grid 126 or body 28, avoiding the potential damage from such activity. At the same time, grid 126 readily permits loading of grain and feed supplement into container 24, while keeping out straw and other foreign matter and denying access to the dairy cattle.

As seen from FIG. 3, ball valve 112, responsive to activation of compressor 66, is raised and hangs from lift cable 64. After dispensing of feed, compressor 66 is de-activated and ball valve 112 returns to a seating engagement against throat 34 to plug the discharge opening. The rate at which the ball valve descends is preferably less than a free fall, to avoid damage to the ball valve or container from sharp impact. Yet, the ball preferably descends fast enough to discourage "bridging" or build-up of feed about the discharge opening. This vertical drop, as compared to a sliding along tapered portion 32, more effectively counteracts bridging.

Figure 5:
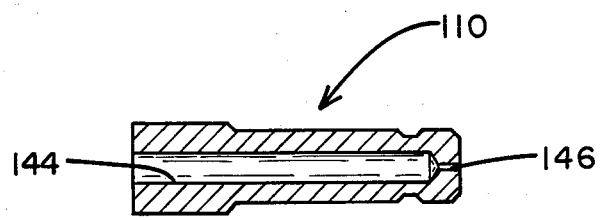
FIG. 5 is a sectional view of an orifice plug used in the feed dispensing control portion of the feeding system.

The ball valve descent speed is controlled by orifice plug 110. As seen from FIG. 5, an elongate opening 144 is formed in plug 142, which tapers at one end to a significantly smaller control orifice 146. In practice, an opening diameter of 0.094 inches coupled with a control orifice diameter of 0.016 inches has been found satisfactory. Control orifice 146 determines the rate at which pressurized air escapes from pneumatic cylinder 48, thus to control the outward movement of reciprocable piston 50 and with it the descent of each ball valve.

The feeding system is used to increase feeding frequency as follows. Assuming a dairy operation desires to provide four feedings equally spaced over a single day, he or she can feed the livestock at e.g. 6:00 A.M. directly, as on the dairy barn floor at each stall, using one quarter of the daily feed requirement for each cow. At the same time, each container is loaded with one-fourth of the cow's daily requirement. The amount of feed, the amount of feed supplement, and therefore the mixture of feed and supplement, can be tailored to each cow if desired. Timer switch 72 then is set to dispense feed at 12:00 noon.

About 6:00 P.M., the dairy operator provides direct feeding and loads the containers as described, and sets the timer to cause dispensing of feed at 12:00 midnight. Thus, the operator is able to provide four substantially equal feedings each day while tending to the cattle only twice, and at times which can coincide with twice daily milkings.

Thus is provided a relatively inexpensive feeding system, enabling the dairy operator to provide frequent feedings individually tailored if desired. The ceiling mounting of the master cable removes it from possible contact by the cattle, and the lift cables are shielded against contact by the lift cable sleeves. The grid at the open top of each container permits direct loading of feed, yet prevents the cattle from gaining access and keeps straw out of the container. Such direct loading enables use of feed that is too moist for conveyance by auger feed systems, with the grid and open top providing air access to such feed, reducing its moisture content more effectively as compared to closed top containers. The system utilizes a single compressor and pneumatic cylinder for up to thirty-five containers, tending to keep the system cost low even for larger dairy herds.

What is claimed is:

1. An apparatus for feeding livestock including:
a generally vertically disposed feed container open at its top to facilitate loading of feed into the container, and having a feed discharge opening, of a predetermined shape, at its bottom;
a valve member having a shape selected to enable a seating thereof into said discharge opening to prevent passage of feed through the discharge opening when so seated;
a generally vertically disposed linkage means including a steel cable connected to the valve member and reciprocable to move said valve member vertically into and out of said seating to store feed and to dispense feed, respectively; and a control means for selectively raising and lowering said linkage means;
a shield, at least substantially surrounding said linkage means and extended upwardly from said container, for preventing livestock from contacting said linkage means and including a metal sleeve with a lower end extending a selected distance below the top of said container; and a fastening means for mounting a lower end portion of said shield with respect to said container, said fastening means including a plurality of bolts mounting to said container and extending generally horizontally across the top thereof in a grid pattern, and a band closure surrounding said sleeve and at least one of said bolts to secure said sleeve and said bolts together.

2. The apparatus of claim 1 wherein:
said container, near its bottom, converges downwardly to said dispensing opening.

3. The apparatus of claim 2 wherein:
said container further includes an inclined plate extended from the bottom of said container for directing the descent of feed dispensed from said container.

4. The apparatus of claim 1 wherein:
said discharge opening is circular in shape, and said valve member is spherical.

5. The apparatus of claim 1 wherein:
said control means comprises a pneumatic cylinder having a reciprocal piston, and a drive connection for joining said linkage means to move vertically as said piston reciprocates.

6. The apparatus of claim 5 wherein:
said linkage means comprises a steel lift cable attached to said valve member, and said drive connection includes a steel master cable attached to said lift cable and to said piston.

7. The apparatus of claim 5 including:
a compressor in fluid communication with said pneumatic cylinder, said compressor moving said piston in a first direction when activated, and permitting the piston to move in a second and opposite direction when de-activated, and a timing control means for activating and de-activating said compressor at predetermined times.

8. The apparatus of claim 7 including:
a plug having an orifice in fluid communication with said pneumatic cylinder, said orifice being of a selected diameter for controlling the release of air from said piston upon de-activation of said compressor, thereby to control movement of said piston in said second direction.

9. An apparatus for feeding a plurality of livestock including;
a plurality of generally vertically disposed feed containers, each container being open at its top to facilitate loading of feed into it, and having at its bottom a feed discharge opening of a predetermined shape; a valve member associated with each feed container and having a shape selecting to enable a seating thereof into its associated discharge opening to prevent passage of feed through the discharge opening when so seated;

a plurality of vertically disposed linkage means, each associated with one of said containers and including a plurality of steel lift cables, each attached to an associated valve member, for reciprocating said associated valves member vertically into and out of said seating to store feed in said associated container and to dispense feed from said associated container, respectively, and a control means for selectively and simultaneously raising and lowering all said linkage means, said control means including a pneumatic cylinder having a reciprocable piston, and a generally horizontally extending master cable attached at one end to said piston, and means connecting the upper end portion of each lift cable to said master cable whereby said valve members reciprocate vertically with the reciprocating of said piston;

a plurality of shields, each comprising a tubular sleeve with the lower end of each sleeve extending a selected distance below the top of its associated container and at least substantially surrounding an associated one of said linkage means and extending upwardly from an associated container, for preventing livestock from contacting said linkage means; and a plurality of fastening means for mounting the lower end portion of each shield with respect to its associated container; and an air compressor in fluid communication with said pneumatic cylinder for supplying air under pressure to said cylinder to move said piston in a first direction, and a biasing means attached to the opposite end of said master cable from the end attached to said piston, for urging said piston in a second end opposite direction.

10. The apparatus of claim 9 further including:
an orifice plug having an orifice in fluid communication with said pneumatic cylinder, said orifice of a selected diameter for controlling the release of air from said piston upon de-activation of said compressor, thereby controlling movement of said piston in said second direction.

11. An inexpensive cattle feeding system, comprising:
a feed container having an enlarged open top to facilitate loading of feed by a dairyman, a lower, reduced size dispersing opening, and a vertically movable, at least partially ball-like valve for selectively opening said dispensing opening;

a grid secured to said container and extending across said enlarged open top to allow loading therethrough while preventing cattle from obtaining access to feed in the container;

a cable extending vertically through said grid into the container and affixed to the valve therein so that movement of said cable will open said valve or allow it to close;

a shield for said cable including a vertical tubular sleeve through which the cable extends, said sleeve having a lower end extending through said grid and into said container and being adapted to prevent cattle from tripping the associated cable to prematurely release feed from said container; and means securing said lower end to said grid to prevent relative movement therebetween so that cattle cannot jostle said tubular sleeve;

whereby said container may be manually and easily loaded through said enlarged open top and said grid while said valve cannot be prematurely opened by cattle.

12. The cattle feeding system of claim 11 wherein said valve is movable upwardly within said container by said cable, and downwardly therein by gravity and further including a reciprocal actuator for driving and releasing said cable, including means for preventing said valve from free falling within said container to prevent damage to said valve and/or said container.

13. The inexpensive cattle feeding system of claim 12 wherein said actuator is pneumatic and said preventing means comprises an orifice in fluid communication with said pneumatic actuator.

14. The inexpensive cattle feeding system of claim 11 further including a deflector plate mounted on said container at said dispensing opening for selectively directing feed when said valve is open.

15. The inexpensive cattle feeding system of claim 11 wherein said grid comprises first spaced elements spanning said open top in one direction and second spaced elements spanning said open top in another direction.

16. An inexpensive cattle feeding system according to claim 11 further including a pneumatic cylinder having a reciprocal piston, means interconnecting said piston and said cable, and control means for said cylinder including a compressor in continuous fluid communication with said pneumatic cylinder, said compressor providing compressed gas to move said piston in a first direction when said compressor is activated, and permitting the piston to move in the opposite direction when said compressor is deactivated, and a timer for selectively activating and deactivating said compressor.

17. The cattle feeding system of claim 16 further including an orifice in fluid communication with said pneumatic cylinder for controlling the release of air therefrom upon deactivation of said compressor to thereby control the rate of movement of said piston in said second, opposite direction; said piston and said cable being constructed and arranged so that said valve moves toward an open position when said piston moves in said first direction and said valve moves toward a closed position when said piston moves in said second direction.

18. The cattle feeding system of claim 17 further including means for urging said piston in said second direction.

19. The cattle feeding system of claim 18 wherein said urging means comprises a weight.

20. An apparatus for feeding a plurality of livestock including;
 a plurality of generally vertically disposed feed containers, each container having an enlarged opening at its top to facilitate loading of feed into it, and having at its bottom a feed discharge opening of a predetermined shape; a valve member associated with each feed container and having a shape selecting to enable a seating thereof into its associated discharge opening to prevent passage of feed through the discharge opening when so seated;
 a plurality of vertically disposed linkage means, each associated with one of said containers and including a plurality of lift cables, each attached to an associated valve member, for reciprocating said associated valves member vertically into and out of said seating to store feed in said associated container and to dispense feed from said associated container, respectively, and a control means for selectively and simultaneously raising and lowering all said linkage means, said control means including a pneumatic cylinder having a reciprocable piston, and a generally horizontally extending master cable attached at one end to said piston, and means connecting the upper end portion of each lift cable to said master cable whereby said valve members reciprocate vertically with the reciprocating of said piston; and
 an air compressor in fluid communication with said pneumatic cylinder for supplying air under pressure to said cylinder to move said piston in a first direction, and a biasing means attached to the opposite end of said master cable from the end attached to said piston, for urging said piston in a second and opposite direction.

* * * * *